US009517534B2

(12) United States Patent
Houdray et al.

(10) Patent No.: US 9,517,534 B2
(45) Date of Patent: Dec. 13, 2016

(54) ELECTRIC INSTALLATION MAINTENANCE METHOD AND DEVICE

(71) Applicant: SCHNEIDER ELECTRIC INDUSTRIES SAS, Rueil Malmaison (FR)

(72) Inventors: Marc Houdray, Grenoble (FR); Jean-Marie Hypolite, Meylan (FR); Matthieu Guillot, Grenoble (FR); Caroline Vollet, Saint Egreve (FR); Jean-Luc Baudouin, Seyssinet Pariset (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 677 days.

(21) Appl. No.: 13/782,291

(22) Filed: Mar. 1, 2013

(65) Prior Publication Data

US 2013/0231756 A1  Sep. 5, 2013

(30) Foreign Application Priority Data

Mar. 5, 2012  (FR) ...................... 12 00654

(51) Int. Cl.
B23P 6/00 (2006.01)
G06Q 10/06 (2012.01)
(Continued)

(52) U.S. Cl.
CPC ............... *B23P 6/00* (2013.01); *G06Q 10/06* (2013.01); *G06Q 10/20* (2013.01);
(Continued)

(58) Field of Classification Search
None
See application file for complete search history.

(56) References Cited

U.S. PATENT DOCUMENTS 4,853,820 A * 8/1989 Ham, Jr. ............... H02H 3/087
361/101
5,032,978 A   7/1991 Watson et al.
(Continued)

FOREIGN PATENT DOCUMENTS

DE  197 07 065 A1  9/1998
EP    1 117 022 A2  7/2001
(Continued)

OTHER PUBLICATIONS

French Preliminary Search Report issued Nov. 27, 2012, in French 1200654, filed Mar. 5, 2012 (with English Translation of Categories of Cited Documents).

*Primary Examiner* — Ryan Jarrett
(74) *Attorney, Agent, or Firm* — Oblon, McClelland, Maier & Neustadt, L.L.P.

(57) ABSTRACT

Method for performing maintenance of an electric installation including at least one electric equipment unit comprising: entry and storing in a database of data representative of an electric installation to be monitored and of data representative of electric equipment settings and parameters, storing of data representative of events in a database so as to constitute an events history, detection of malfunctioning disturbances, analysis of causes of malfunctioning of the electric installation, management of restoration of operation of a part of the installation. Management of restoration of operation comprises monitoring by a decision tree to evaluate a criticality level.

14 Claims, 9 Drawing Sheets

(51) Int. Cl.
*G06Q 10/00* (2012.01)
*G05B 23/02* (2006.01)
(52) U.S. Cl.
CPC ..... *G05B 23/0283* (2013.01); *Y10T 29/49718* (2015.01); *Y10T 29/52* (2015.01)

(56) References Cited

U.S. PATENT DOCUMENTS

| | | | |
|---|---|---|---|
| 5,132,920 A | 7/1992 | Bellows et al. | |
| 8,121,740 B2* | 2/2012 | Yang | H02J 13/00 700/283 |
| 2001/0007971 A1 | 7/2001 | Okada | |
| 2002/0116148 A1 | 8/2002 | Bertsch et al. | |
| 2008/0197715 A1* | 8/2008 | Karlsson | H02H 3/066 307/125 |
| 2009/0319093 A1* | 12/2009 | Joos | H02J 3/14 700/297 |
| 2010/0152910 A1* | 6/2010 | Taft | G01R 25/00 700/286 |
| 2012/0004867 A1* | 1/2012 | Mousavi | G01R 31/3274 702/58 |

FOREIGN PATENT DOCUMENTS

| | | |
|---|---|---|
| EP | 1 217 486 A1 | 6/2002 |
| WO | WO 96/20439 A1 | 7/1996 |

* cited by examiner

ELECTRIC INSTALLATION MAINTENANCE METHOD AND DEVICE

BACKGROUND OF THE INVENTION

The invention relates to a method for performing maintenance of an electric installation comprising at least one electric equipment unit.

The invention relates to a device for performing maintenance of an electric installation comprising at least one electric equipment unit, processing means, and communication means designed to be connected to said at least one electric equipment unit.

The invention also relates to an electric installation comprising maintenance of at least one electric equipment unit comprising processing means and communication means designed to be connected to an electric equipment unit.

STATE OF THE ART

It is known in maintenance methods and devices to transmit operating data to supervisors to display current or power values or causes of tripping of electric equipment such as circuit breakers, in real time. It is also known to enter a wiring diagram of an electric installation in a computer system and to display such a diagram with open or closed states. Certain electric equipment units comprise remote-controlled or automated opening and/or closing means.

In the event of a malfunction in an installation, this data enables a fault to be located in more or less pertinent manner. This fault location is essentially based on the state of the electric equipment and does not enable the causes of the fault to be deduced therefrom in sufficiently precise manner. Furthermore, restarting of the installation frequently requires a local operation to check whether the fault is still present or whether it has been cleared. The consequence of this situation is a longer installation down-time even for malfunctions of low criticality level.

SUMMARY OF THE INVENTION

The object of the invention is to provide a method and a device for performing maintenance monitoring enabling the down-time of an installation to be reduced, as well as an installation implementing this method.

According to the invention, a maintenance method of an electric installation comprising at least one electric equipment unit comprises:
  entry of data representative of an electric installation to be monitored in a database,
  storing data representative of electric equipment settings and parameters,
  storing data representative of events occurring in said electric installation to be monitored in a database so as to constitute an events history,
  detection of malfunctioning or opening disturbances of at least one electric protection equipment unit in an electric installation,
  analysis of causes of malfunctioning of the electric installation according to data of the events history and the state of the installation,
  management of restoration of operation of a part of the installation that is out of service according to the causes of malfunctioning and/or the state of electric lines of the installation, and to a predefined decision tree.
Advantageously, the maintenance method comprises:
  detection of a voltage outage in a part of an electric installation,
  determining the cause of said voltage outage according to events recorded in the events history.
Advantageously, the maintenance method comprises:
  detection of electric short-circuits in an electric line,
  disabling closing of an electric equipment unit or of the power supply of said electric line so long as a short-circuit is detected,
  indication and/or communication of said disabling of power supply of said line.
In the maintenance method, said restoration management comprises:
  indication of events,
  acknowledgement of events having a high criticality level,
  enabling power supply of an electric line after acknowledgement of events having a high criticality level.
Advantageously, the maintenance method comprises:
  detection of the causes of opening of an electric switchgear unit according to communication of its state, local or remote controls, operating conditions, and/or an ageing computation,
  disabling manual or automatic reclosing of said faulty equipment unit,
  indication of critical causes of malfunctioning of the installation, and
  acknowledgement of an event indicating at least one fault of the equipment unit.
Advantageously, the maintenance method comprises selection of malfunctions caused by electric faults and of malfunctions not caused by electric faults.

Preferably, the maintenance method comprises evaluation of a criticality level by a decision tree comprising:
  monitoring of the causes of tripping of an electric equipment unit,
  monitoring of external commands,
  monitoring of the events history,
  selectivity monitoring, and/or
  monitoring of ageing data.
Advantageously, the maintenance method comprises remote control of closing of an electric equipment unit or of power supply of an electric line.

According to the invention, in a maintenance device of an electric installation comprising at least one electric equipment unit, processing means, and communication means designed to be connected to said at least one electric equipment unit, the processing means comprise means for implementing a method as defined in the foregoing.

Preferably, said processing means comprise:
  means for storing data representative of an electric installation to be monitored,
  means for storing data representative of settings and parameters of electric equipment units,
  means for storing time-stamped data representative of events occurring in said electric installation to be monitored so as to constitute an events history, and
  communication means.
Advantageously, the maintenance device comprises at least one short-circuit detector connected to at least one line of the electric installation to be monitored to supply signals representative of the presence of a short-circuit to the processing means.

The maintenance device preferably comprises at least one current leakage detector or an insulation monitor located on or connected to at least one line of the electric installation to be monitored to provide signals representative of a current earth leakage or of an insulation fault to the processing means.

Advantageously, the maintenance device comprises means for receiving remote control of at least one electric equipment unit.

In an electric installation according to the invention comprising maintenance of at least one electric equipment unit comprising processing means and communication means designed to be connected to an electric equipment unit, the processing means comprise means for implementing a method as defined in the foregoing.

Advantageously, the electric installation comprising electric equipment comprises at least one device as defined in the foregoing connected by communication means to said electric equipment to receive data representative of events.

BRIEF DESCRIPTION OF THE DRAWINGS

Other advantages and features will become more clearly apparent from the following description of particular embodiments of the invention, given for non-restrictive example purposes only, and represented in the appended drawings in which.

DETAILED DESCRIPTION OF PREFERRED EMBODIMENTS

Figure 1:
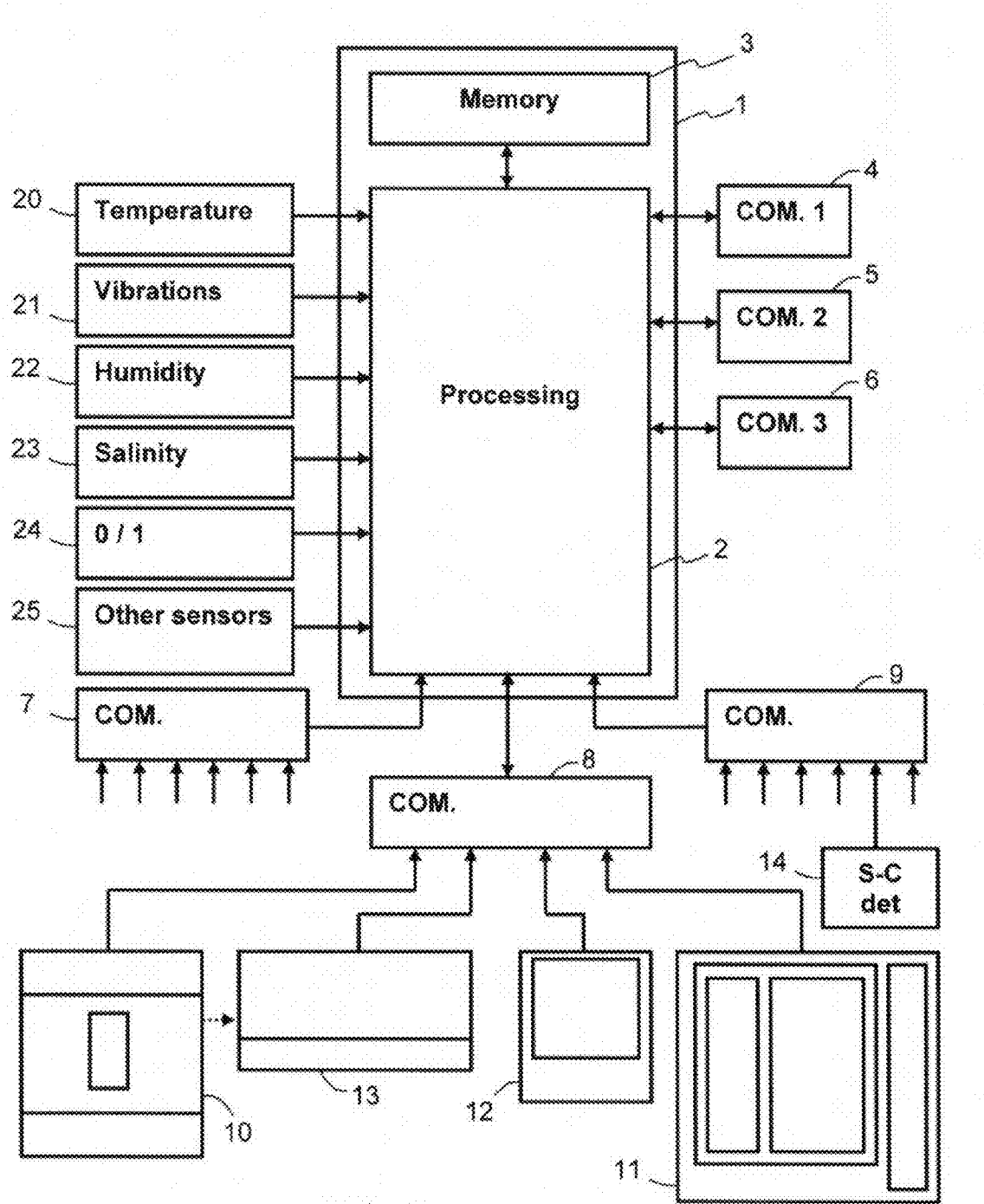
FIG. 1 represents a diagram of a maintenance device of an electric installation according to an embodiment of the invention.

The device for performing maintenance of an electric installation according to an embodiment of the invention represented in FIG. 1 comprises a processing module 1 represented by a case 1 comprising a processing circuit 2 performing computation and communication management and also data receipt and transmission. Module 1 also comprises a storage module 3 for storing electric equipment setting characteristics, electric installation diagrams, historical accounts of events occurring in an electric installation and/or selectivity and ageing computation data of said electric equipment. The storage module 3 also stores criticality criteria and data used in a decision tree. This data can be shared, exchanged or duplicated with a supervisor or other storage modules. To communicate with other devices or a supervisor, the processing module comprises at least one hard-wired communication circuit 4, and/or a wireless communication circuit 5, and/or a communication circuit via a cell phone network.

Display on a supervisor can be represented by a global or partial wiring diagram of the installation showing the states of each equipment unit as well as the references, characteristics and settings. Indication can also be performed on portable computers, tablets or mobile phones via wireless connections or via a cell phone network.

A monitoring device according to an embodiment of the invention comprises a data communication network between the electric equipment units and the processing means to communicate data. The communication network can comprise the communication concentrator modules 7, 8, 9 to reduce the number of communication inputs of the processing module. The concentrators are connected to several electric equipment units 10, 11, 12, 13, 14 to communicate, among other data, information on operating conditions, equipment type and references to the processing module, grouping the messages together on a communication channel.

The electric equipment units are in particular circuit breakers 10, 11, with for example electronic trip units or protective relays. The equipment units can also be differential or earth leakage detection modules or relays 12, or power measurement modules 13 preferably associated with switchgear units such as circuit breakers or contactors. Likewise, short-circuit detectors 14 can give information on the state of an electric line or of a load to prevent closing of an equipment unit or to locate an electric short-circuit fault.

The electric installation maintenance device of FIG. 1 comprises measurement inputs designed to be connected to measurement sensors of environmental physical quantities. It communicates and provides indications of maintenance of the electric installation in local or remote manner. Measurement sensors of environmental physical quantities are thus connected to the processing module 1.

The measurement sensors of environmental physical quantities in particular comprise:
- a temperature sensor 20 preferably situated in a space close to the electric equipment units concerned by ageing computation,
- a vibration amplitude and frequency sensor 21,
- a humidity content sensor 22, and/or
- a salinity content sensor 23.

A binary input sensor 24 can also be connected to the module 1 for the purposes of ageing computation. In this case, it can for example count the number of operations of an electric equipment unit. Other sensors 25 can also be connected to the module 1 to assist maintenance of the electric installation.

Sensors 20 to 25 can be permanent sensors or sensors installed only when measurements are made. Furthermore, certain data such as the salinity or dust content can be determined previously or entered directly by manual entry.

Figure 2:
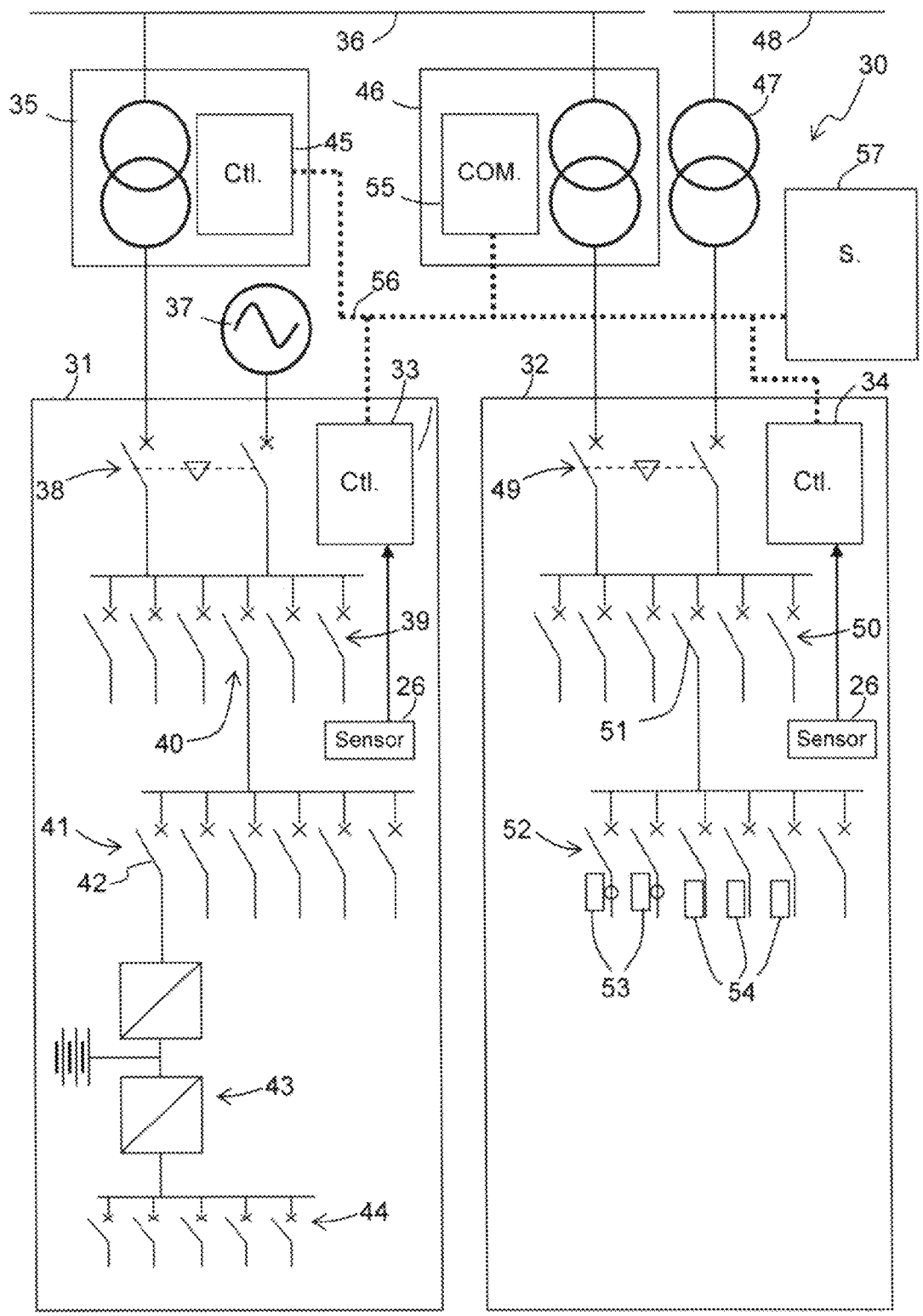
FIG. 2 represents a diagram of an electric installation comprising maintenance monitoring according to an embodiment of the invention.

FIG. 2 represents a diagram of an electric installation 30 comprising maintenance means according to an embodiment of the invention 1. In this figure, the installation comprises 2 electric cabinets, cubicles or panels 31, 32 each comprising an electric installation maintenance device respectively 33 and 34.

Cabinet 31 is supplied on the one hand by a transformer substation 35 connected line-side to a medium-voltage electric power system 36 and on the other hand by an autonomous generator 37. These two low-voltage power supplies are input to a power supply change-over switch 38 composed of two remote-controlled and mechanically locked circuit breakers. Load-side from the changeover switch, the power is supplied to a first group 39 of circuit breakers. Then a circuit breaker 40 of group 39 supplies a second group 41 of circuit breakers. A circuit breaker 42 of the second group performs load-side supply of an electric power conversion and storage device 43, and then supplies a third group 44 of circuit breakers. The transformer substation 35 can also comprise circuit breakers or disconnecting switches line-side on the medium voltage and on the low-voltage side. In each cabinet, sensors 26 measuring environmental physical quantities can be common for assistance in maintenance of the electric installation. Maintenance of the electric installation is centralized by a device 33 for the cabinet 31 or sent up to a supervisor. Each cabinet is then a climatic zone for computing ageing of the electric equipment that is installed therein. Each electric equipment unit comprising a communication device sends operating condition data to the computation device 33 which records all the events occurring in this part of the installation. For the other equipment units, computation of their states can also be performed according to values of climatic conditions, to measurement of the latter, and to previously stored data. The device 33 can also record data representative of selectivity computation.

The cabinet 32 is supplied on the one hand by a transformer substation 46 connected line-side to a medium-voltage electric power system 36 and on the other hand by a transformer 47 to a second medium-voltage electric power system 48. Load-side from substation 46 and from transformer 47, two low-voltage power supplies are input to a power supply change-over switch 49 composed of two remote-controlled and mechanically locked circuit breakers. Load-side from the changeover switch, power is supplied to a first group 50 of circuit breakers. Then a circuit breaker 51 of group 50 supplies a second group 52 of circuit breakers. The equipment units comprising a communication device send operating condition data to the control device 34. Earth leakage or insulation fault detectors 53 are fitted on feeders to locate faulty lines. Short-circuit detectors 54 fitted on feeders enable line or load faults to be located. The data provided by the detectors 53 and 54 are defined as high criticality conditions in a decision tree and are designed to disable restoration of operation of the part of the installation concerned. It is also possible for the detectors 54 to provide stress data for computation of ageing of electric equipment.

A communication device 55 located in the transformer substation 46 can also send data used for selectivity computation to the control device 34.

The electric installation maintenance devices are connected to one another by a communication network 56 and to a supervisor 57.

Figure 3:
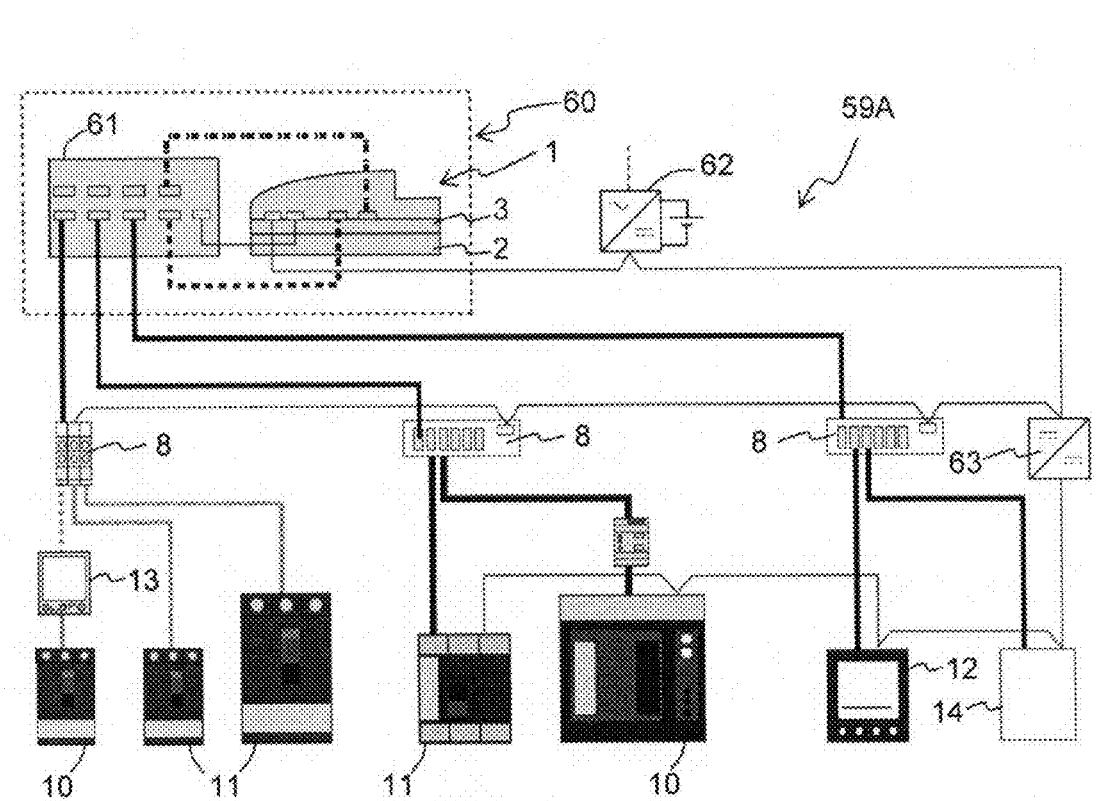
FIGS. 3 to 5 represent installations according to variants of embodiments of the invention.

FIG. 3 shows another diagram of a part of an installation 59 with an electric installation maintenance device having a processing enclosure 60 comprising a processing module 1 and a management module 61 of the communication circuits and of the inputs-outputs of different sensors. The circuit 61 is connected to communication concentrators 8 receiving data from electric equipment units 10 to 14. The concentrators and communication circuits of the equipment units are for example supplied by the power supply circuits comprising converters 62 and 63 and lines 64 and 65.

Figure 4:
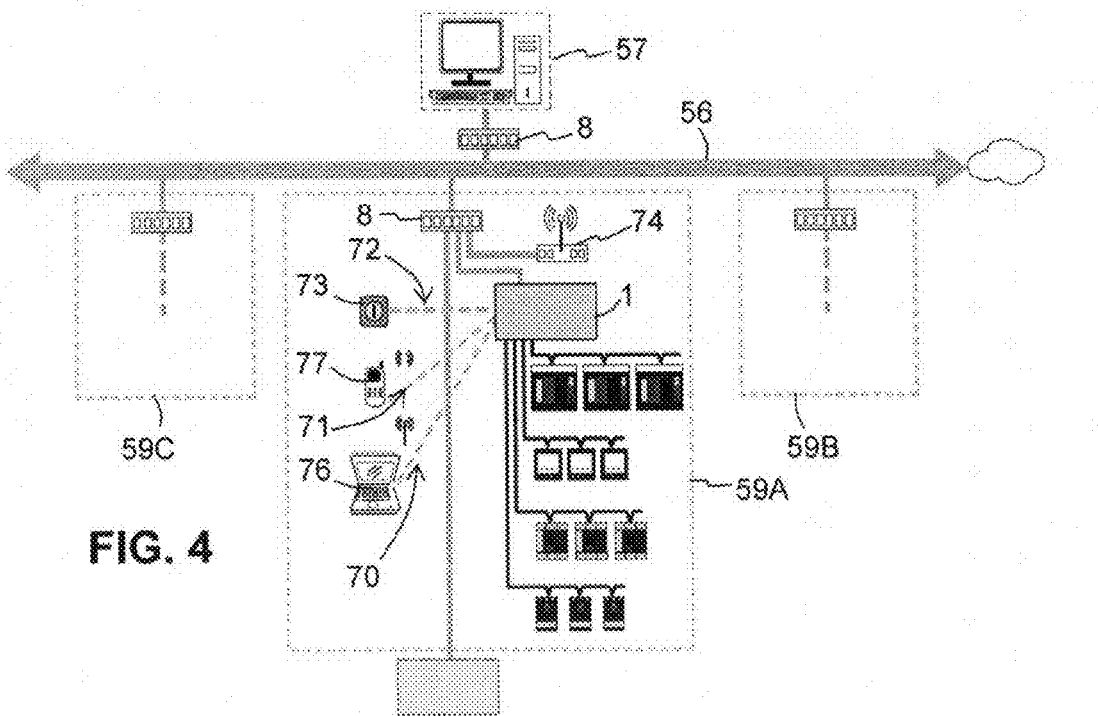
Figure 5:
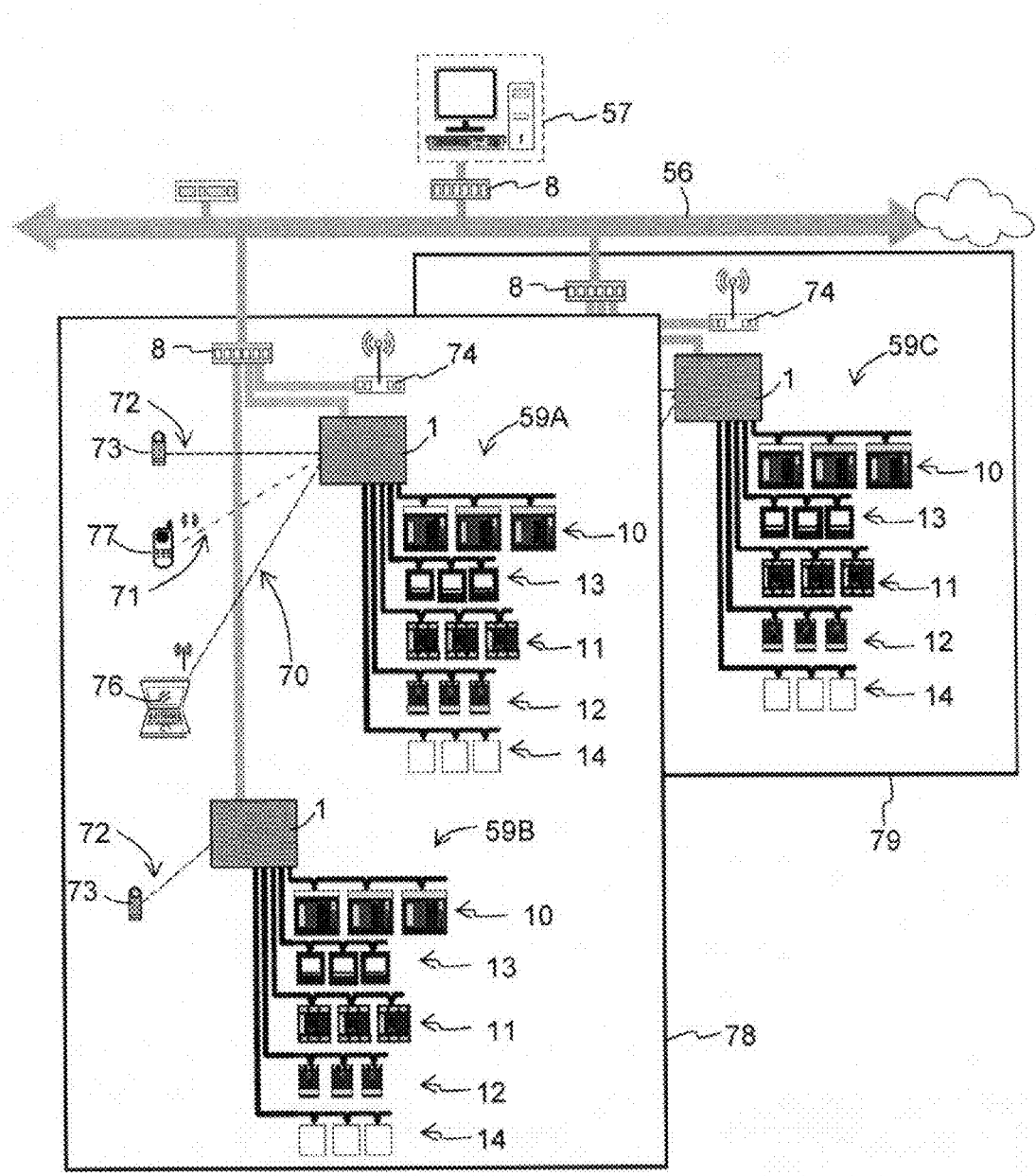

FIGS. 4 and 5 represent installations according to alternative embodiments of the invention. In FIG. 4, parts of installation 59A, 59B, 59C are connected to a communication network 56 connected to a supervisor 57. Electric installation maintenance is thus global and can be monitored by a central or remote operator. To ensure safety and ruggedness of supervision of the electric equipment units and efficient transmission of events, computation can be performed in each maintenance device of the electric installation. Furthermore, the data concerning diagrams, settings and monitoring of the state of events history constitution are preferably exchanged, compared and consolidated in each storage module of the monitoring devices.

The part of installation 59A comprises a wireless communication link 70, a cell phone communication link 71, and a radio communication link 72 to communicate with the electric installation maintenance processing module 60. Link 72 is for example used by an enclosure 73 commanding opening or closing of an electric equipment unit such as a remote-controlled circuit breaker, a contactor, or a switching circuit breaker. Links 70 and 71 are for example used by a local operator to be informed on the state of the installation, the setting data and/or the events history data to modify said data or to perform remote control of the equipment. A wireless communication module 74 is connected to a concentrator 8 to communicate for example with the supervisor or with other parts of the installation. Indication of the state of the electric equipment or of the electric installation can thus also be performed on portable computers 76, wireless link tablets 70 or mobile phones 77 or a tablet via a cell phone network 71.

In FIG. 5, parts of installation 59A and 59B are for example in the same equipment room. Certain links 70, 71 and modules 74 can thus be combined in the same equipment room 78. The links 72 with the remote control enclosures are associated with each processing module 1. In another equipment room 79, another part of an installation 59C is connected to the supervisor and to parts 59A, 59B via the communication network 56.

Figure 6:
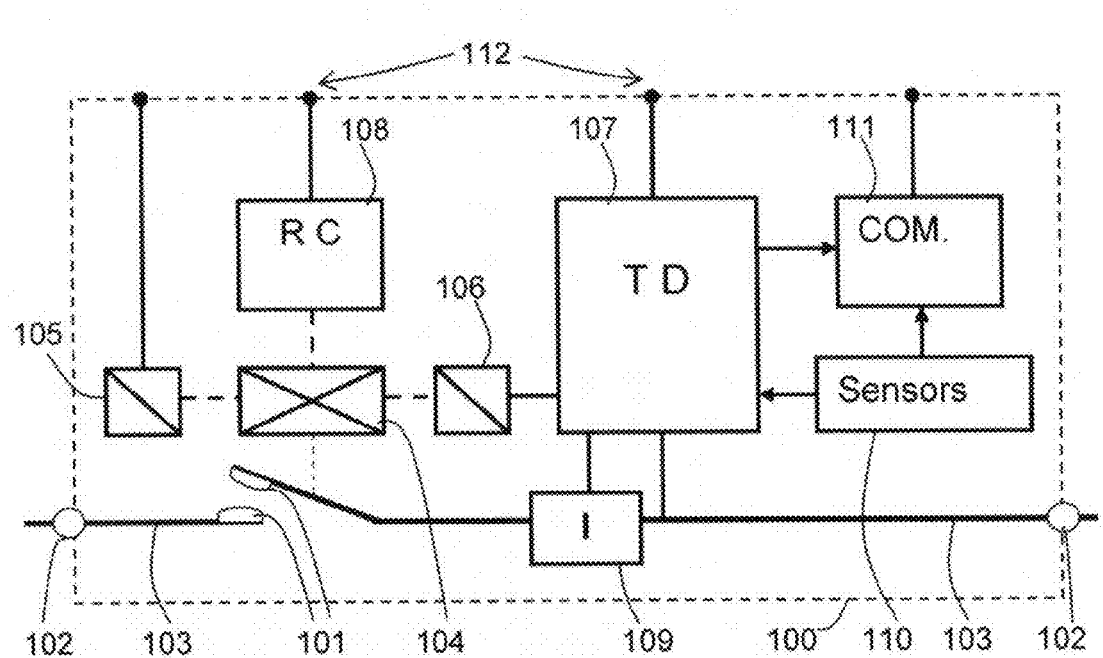
FIG. 6 represents a diagram of an electric equipment unit designed to be used with an electric installation maintenance device according to an embodiment of the invention.

FIG. 6 shows a diagram of an electric equipment unit such as a circuit breaker 100 designed to be used with an electric installation device according to an embodiment of the invention. The circuit breaker comprises power contacts 101 connected to connection terminals 102 by power conductors 103. The contacts 101 are actuated by a mechanism 104 able to be controlled manually or by the control devices. In the circuit breaker of FIG. 6, the mechanism 104 is controlled by an actuator 105 such as an overvoltage and/or under-voltage release coil, by a trip relay 106 associated with a trip device 107, or by a remote-control device 108 able to open and close the contacts 101. The electronic trip device 107 receives signals representative of currents flowing in the conductors 103 and measured by the current sensors 109. Other sensors 110 are connected to the trip device 107 to provide information such as the local temperature. The circuit breaker also comprises a communication module 111 connected to a trip device and/or to sensors to provide data for electric installation maintenance to the module 1. Terminals 112 enable connection of certain elements of the circuit breaker.

Figure 7:
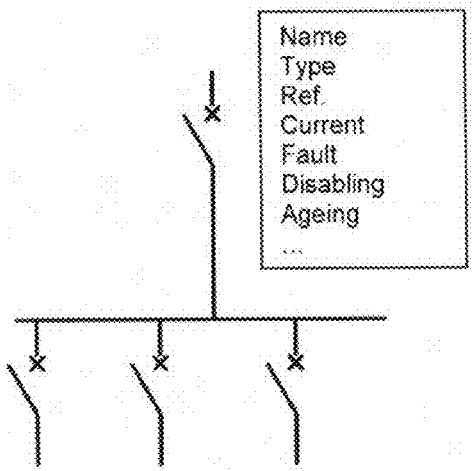
FIG. 7 represents a diagram of presentation of electric equipment data showing information for performing electric installation maintenance management.

FIG. 7 represents a diagram of presentation of the electric equipment data showing electric installation maintenance data and a decision tree. This type of diagram can appear on monitoring and diagnostic tools 57, 76, 77.

Figure 8:
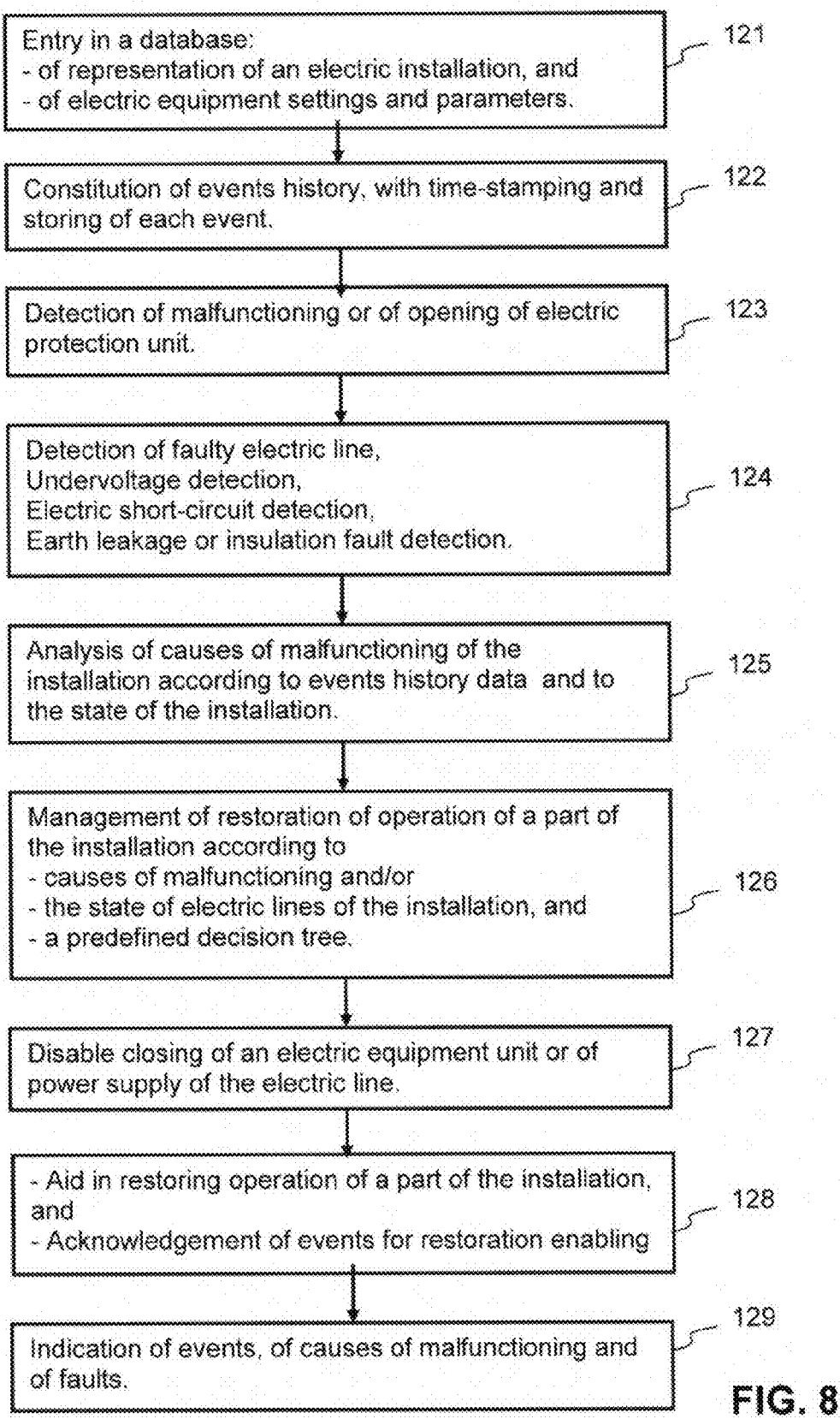
FIG. 8 represents a first flowchart of an electric installation maintenance method according to an embodiment of the invention.

FIG. 8 represents a first flowchart of a maintenance method of an electric installation comprising at least one equipment unit according to an embodiment of the invention. In a step 121, data representative of an electric installation to be monitored is entered in a database, and storage of data representative of settings and parameters of electric equipment units is performed. Then a step 122 performs time-stamping and storing in a database of data representative of events occurring in said electric installation to be monitored so as to constitute an events history. A step 123 performs detection of malfunctioning disturbances or opening of at least one electric protection unit in the electric installation. A step 124 performs detection of additional malfunctions such:

detection of a faulty electric line,
detection of a voltage outage in a part of an electric installation,
detection of electric short-circuits in an electric line, and/or
earth leakage or insulation fault detection.

A step 125 performs analysis of causes of malfunctioning of the electric installation according to data of the events history and to the state of the installation. Then a step 126 performs management of restoration of operation of a part of the installation that is out of service according to the malfunctioning causes and/or to the state of electric lines of the installation, and to a predefined decision tree. The decision tree performs sequences of successive tests to determine a criticality level of the malfunctions and to evaluate the risk of restoring operation of the installation. Earthing or a persistent short-circuit are for example considered as being malfunctions of high criticality level and do not allow automatic restoration of operation of the installation.

A step 127 performs disabling of closing of an electric equipment unit or of supply of said electric line so long as a short-circuit is detected. When an electric short-circuit in a line is detected in step 124, step 127 can thus disable restoration of the supply of said line so long as the short-circuit persists. Indication and/or communication of said disabling of supply of said line is performed in a step 129.

When a voltage outage is detected in step 124, step 126 enables the origin of said voltage outage to be determined according to events recorded in the events history.

Analysis of the causes of malfunctioning in step 125 comprises selection of malfunctions caused by electric faults and of malfunctions not caused by electric faults.

A step 128 performs assistance in management of restoration of operation of the installation or of a part of the installation, this step in particular comprising:

indication of events,
acknowledgement of events having a high criticality level, and
enabling power supply of an electric line after acknowledgement of events having a high criticality level.

When malfunctioning concerns an electric equipment unit, the method in particular comprises:

a step 125 of detecting the causes of opening of an electric switchgear unit according to communication of its state, to local or remote controls, to operating conditions, and/or to an ageing computation,
a step 127 of disabling manual or automatic reclosing of said faulty equipment unit,
a step 129 of indicating critical causes of malfunctioning of the installation, and
a step 128 of acknowledging events indicating at least one fault of the equipment unit.

Figure 9:
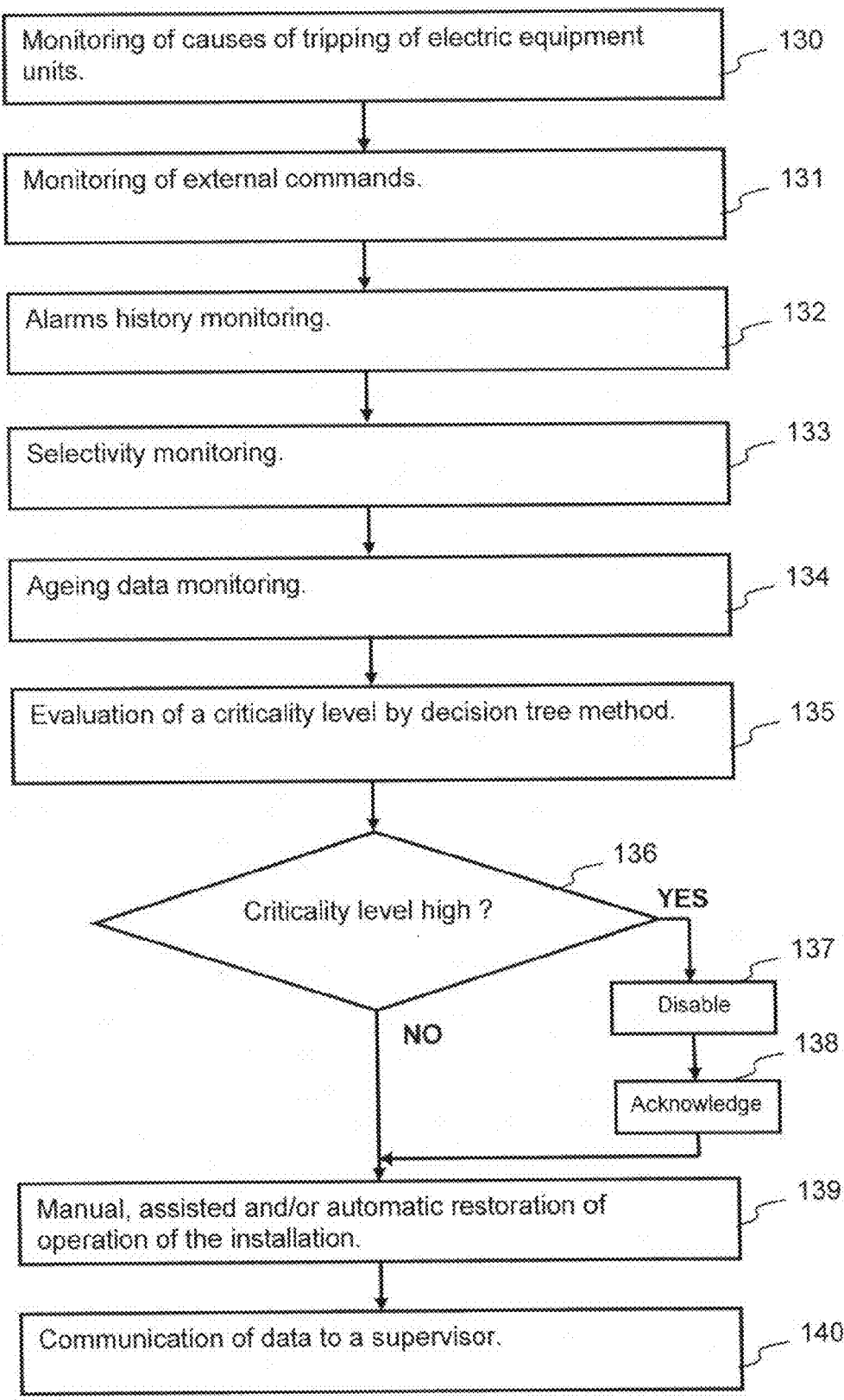
FIG. 9 represents a second flowchart of an electric installation maintenance method according to an embodiment of the invention.

FIG. 9 represents a second flowchart of an electric installation maintenance method according to an embodiment of the invention comprising steps of a decision tree.

Monitoring according to a decision tree in particular comprises:

a step 130 of monitoring the causes of tripping of an electric equipment unit,
a step 131 of monitoring external commands,
a step 132 of monitoring the events history,
a step 133 of monitoring selectivity, and/or
a step 134 of monitoring ageing data.

Then a step 135 evaluates a criticality level by the decision tree method. A step 136 monitors the criticality level. If the criticality level is high, a step 137 disables closing of an electric equipment unit or supply of a part of the installation concerned. Then a step 138 enables acknowledgement of critical faults before local or remote reclosing of the electric equipment unit. A step 139 thus enables restoration of operation of the installation in manual, assisted or automatic manner. This step 139 can also comprise remote control of closing of an electric equipment unit or supply of an electric line. A step 140 performs communication of data to a supervisor. These events will also form part of the events history recorded in the memory.

Figure 10:
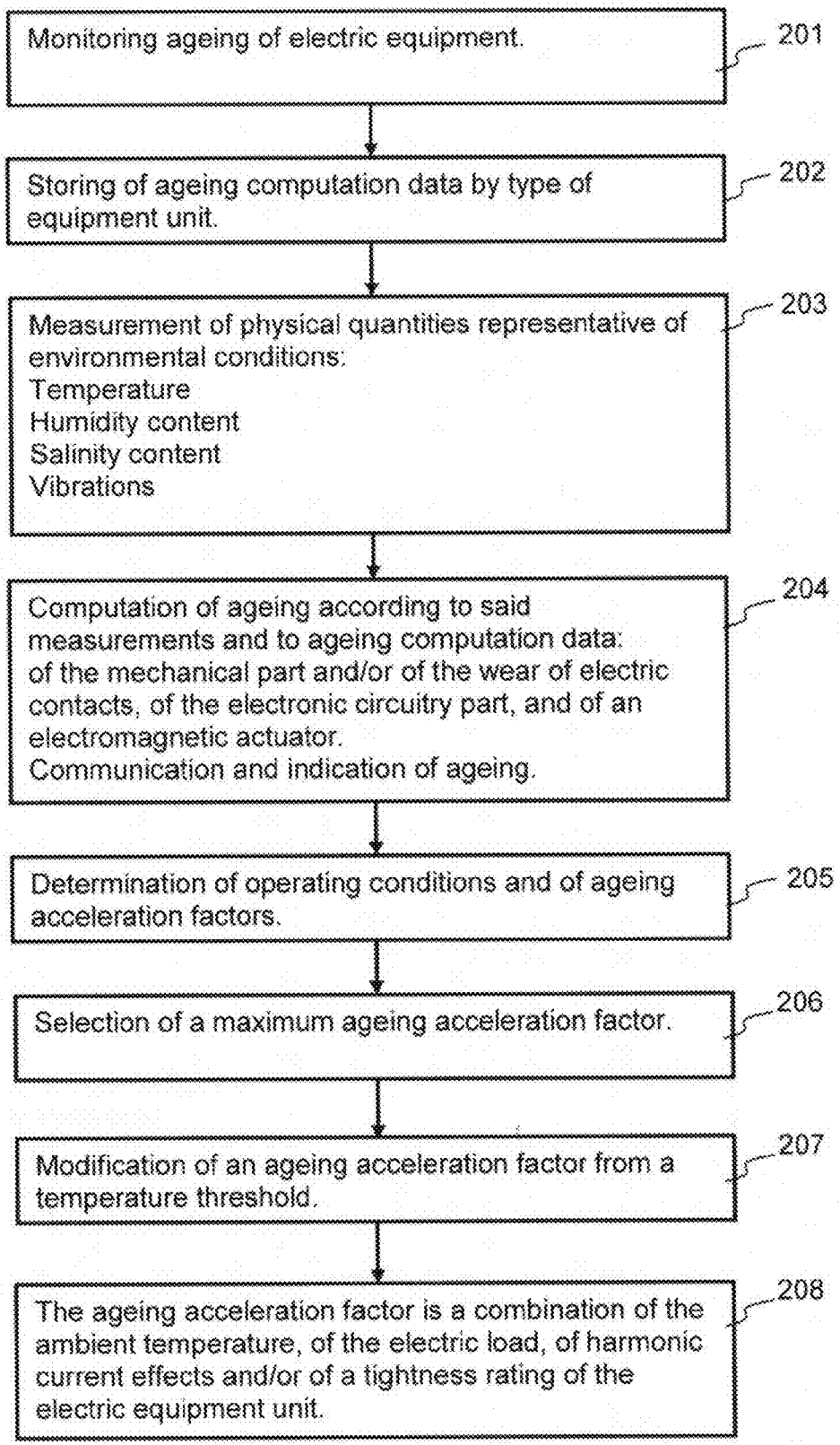
FIG. 10 represents a flowchart of a method for monitoring ageing of electric equipment able to be associated with an electric installation maintenance method according to an embodiment of the invention.

FIG. 10 represents a flowchart of a method for monitoring ageing of electric equipment able to be associated with a maintenance method of an electric installation according to an embodiment of the invention. This flowchart corresponds in particular to functions performed in step 134 represented in FIG. 9.

Step 201 initializes monitoring of ageing of the electric equipment. It in particular stores the characteristics of each type or reference of electric equipment able to be used in the installation. Step 202 performs storage of ageing computation data by equipment type. The diagram is entered in single-line form defining the line-side and load-side connection points and the references of each equipment unit and settings. The diagram can be entered by means of graphic tools or imported from other software.

A step 203 performs measurement and recording of physical quantities representative of environmental conditions. Step 203 in particular comprises:

temperature measurement and storage by a sensor close to said electric equipment units,
measurement and storage of the humidity content,
measurement and storage of the salinity content, and/or
measurement and storage of amplitude and frequency of vibrations.

A step 204 performs computation of ageing according to said measurements and to the stored ageing computation data. In this step, ageing computation comprises:

computation of ageing of the mechanical part and/or of the wear of electric contacts of said equipment unit,
computation of ageing of the electronic part of said equipment unit, and/or
computation of ageing of an electromagnetic actuator of said electric equipment unit.

At the end of computation, communication and/or indication of data representative of results of computation of ageing of the electric equipment is performed.

A step 205 determines operating conditions in particular by performing:

counting operations of an electric equipment unit,
measurement of conditions of operations of the electric equipment unit, and
recording data representative of operations associated with values of the broken current.

Step 205 also performs determination or computation of ageing acceleration factors. A step 206 selects a maximum ageing acceleration factor from several ageing acceleration factors.

Step 206 enables a certain independence of the ageing acceleration factors to be taken into account. It is also possible to weight several acceleration factors in a common factor.

In a step 207, the method modifies a value of the ageing acceleration factor due to the temperature from a temperature threshold. For example, above 85° C., an electronic circuit can have a much higher ageing acceleration factor.

A step 208 assigns a combination of ageing acceleration factors to the ageing acceleration factor due to the temperature, such as the ambient temperature, the type of electric load, the effects of harmonic currents and/or the tightness rating (IP) of said electric equipment unit.

Figure 11:
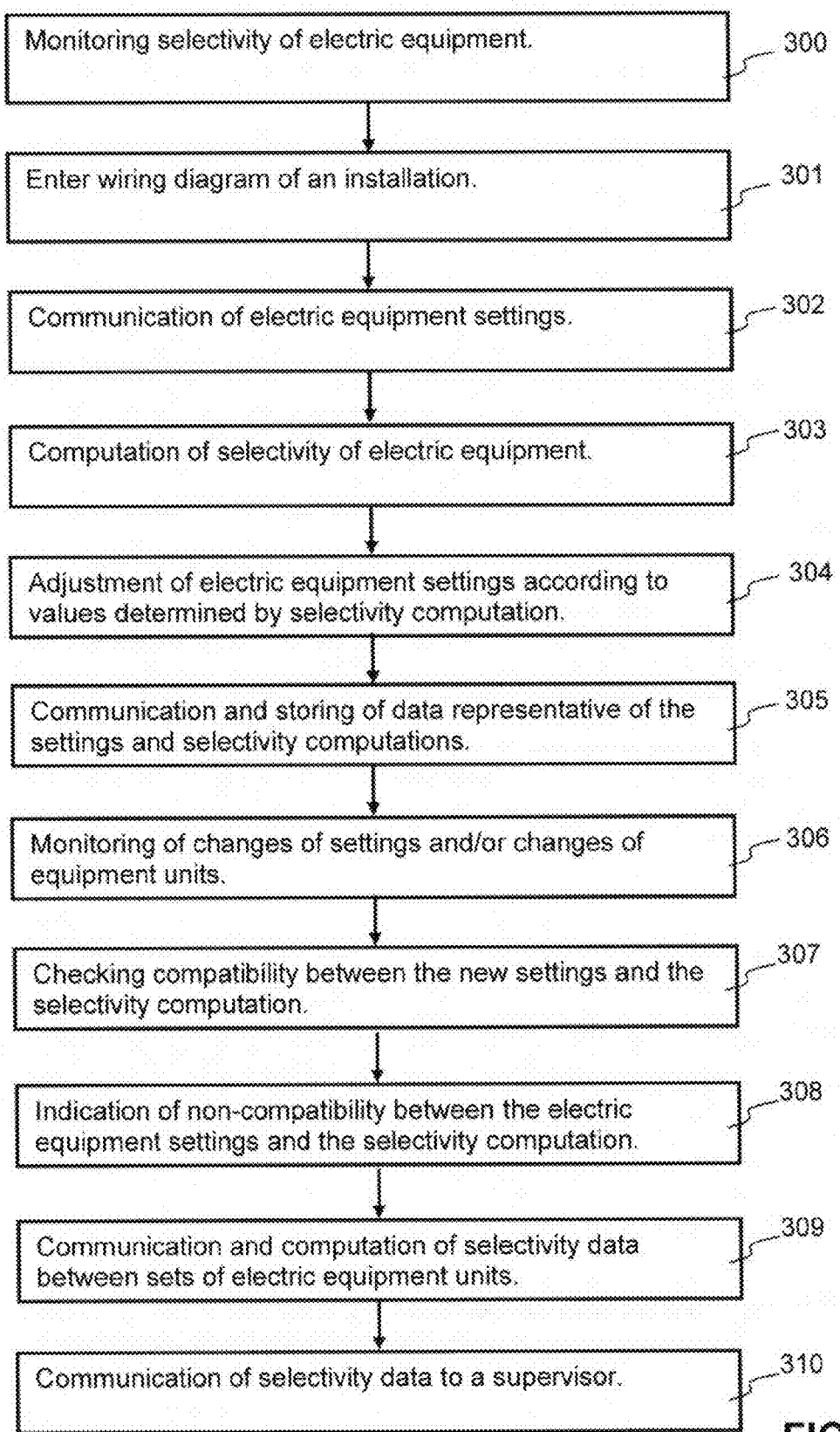
FIG. 11 represents a flowchart of a method for monitoring selectivity of electric equipment able to be associated with an electric installation maintenance method according to an embodiment of the invention.

FIG. 11 represents a flowchart of a method for monitoring selectivity of the electric equipment able to be associated with a method for performing maintenance of an electric installation according to an embodiment of the invention. This flowchart in particular corresponds to functions performed in step 133 represented in FIG. 9.

Step 300 initializes monitoring of electric equipment selectivity. It in particular stores the characteristics of each type or reference of electric equipment able to be used in the installation. Step 301 enables the diagram of the electric installation to be entered. The diagram is entered in single-line form defining the line-side and load-side connection points and also the references of each equipment unit and the settings at least for the equipment without communication devices. The diagram can be entered by means of graphic tools or imported from other software.

Then a step 302 performs communication of settings of electric equipment between at least one electric equipment unit and a data concentrator or a selectivity processing device. A step 303 performs computation of the electric equipment selectivity according to said electric equipment settings. Selectivity computation takes account of the wiring diagram data with the connections of the equipment units, the setting data of said equipment units entered automatically by communication and possibly entered manually for small equipment units without communication. A step 304 enables setting of electric equipment to be performed according to setting values determined by the selectivity computation. This step 304 can serve the purpose of initial parameter setting or of subsequent settings. These subsequent settings can thus be performed manually, by remote setting, in automatic manner by loading values by means of the communication devices, or in semi-automatic manner with manual settings, remote settings, and automatic settings. The automatic parts of the settings are preferably subjected to authorisation and/or acknowledgement. A step 305 performs storing and communication of data representative of the new settings and of the selectivity data. A step 306 performs monitoring of setting changes and/or of equipment changes. Then a step 307 checks the compatibility between new settings after a change and selectivity computation.

In case of non-compatibility, a step 308 triggers indication of non-compatibility between electric equipment settings and selectivity computation. Indication can be performed in local manner, and transmitted to the set of selectivity control modules and/or to a supervisor.

In a step 309, the selectivity data is communicated and computed between sets of electric equipment. In a step 310, said selectivity data is communicated to a supervisor for a global vision of the selectivity of the installation equipment. Selectivity computation can be triggered at each change of electric equipment or at each change of setting of at least one electric equipment unit.

In the installations described in the foregoing, the links between equipment units are described with a hard-wired network and concentrators. These hard-wired links are preferably achieved with the "MODBUS" industrial communication standard. Other standards can however be used. The links can also be wireless links of types well known under the names of "WI-FI" or "ZigBee".

The invention claimed is:

1. A method for performing maintenance of an electric installation comprising electric equipment, the method comprising:
   entering, with circuitry, data representative of an electric installation to be monitored in a database;
   storing, in the circuitry, data representative of electric equipment settings and parameters;
   storing, in the circuitry, a database of events history including data representative of events occurring in said electric installation to be monitored;
   storing, in the circuitry, criticality criteria used to determine a criticality level of malfunctions;
   detecting, with the circuitry, malfunctioning of at least one electric protection equipment in the electric installation or of the electric installation itself;
   analyzing, with the circuitry, causes of the malfunctioning according to data of the events history and a state of the installation;
   determining, with the circuitry, a criticality level of the malfunctioning based on the causes of the malfunctioning and the criticality criteria; and
   managing, with the circuitry, restoration of operation of a part of the installation that is out of service according to the causes of malfunctioning, a state of electric lines of the installation and the criticality level, and according to a predefined decision tree,
   wherein managing restoration of operation includes preventing automated restoration of operation of the part of the installation that is out of service when the criticality level of the malfunction indicates an Earth leakage or short circuit.

2. The maintenance method according to claim 1 comprising:
   detecting a voltage outage in a part of the electric installation, and
   determining a cause of said voltage outage according to events recorded in the events history.

3. The maintenance method according to claim 1 comprising:
   detecting electric short-circuits in an electric line, disabling closing of the electric equipment or of a power supply of said electric lines when a short-circuit is detected, and
   indicating disabling of the power supply of said electric lines.

4. The maintenance method according to claim 1 wherein said managing of restoration comprises:
   indicating events,
   acknowledging events having a high criticality level, and
   enabling power supply of an electric line after acknowledgement of events having a high criticality level.

5. The maintenance method according to claim 1 comprising:
   detecting causes of opening of an electric switchgear according to communication of a state thereof, local or remote controls, operating conditions, and/or an ageing computation,
   disabling manual or automatic reclosing of said switchgear, indicating critical causes of malfunctioning of the installation, and acknowledging an event indicating at least one fault of the electric equipment.

6. The maintenance method according to claim 1 comprising selecting malfunctions caused by electric faults and of malfunctions not caused by electric faults.

7. The maintenance method according to claim 1 comprising evaluating a criticality level by a decision tree comprising:

monitoring causes of tripping of the electric equipment,
monitoring external commands,
monitoring the events history, and
selectivity monitoring, and/or monitoring ageing data.

8. The maintenance method according to claim 1 comprising remotely controlling closing of the electric equipment or of power supply of an electric line.

9. A maintenance device of an electric installation comprising electric equipment, the maintenance device comprising:

circuitry configured to
enter data representative of an electric installation to be monitored in a database,
store data representative of electric equipment settings and parameters,
store data representative of events occurring in said electric installation to be monitored in a database so as to constitute an events history,
store criticality criteria used to determine a criticality level of malfunctions;
detect malfunctioning of at least one electric protection equipment in the electric installation or of the electric installation itself,
analyze causes of the malfunctioning according to data of the events history and a state of the installation,
determine a criticality level of the malfunctioning based on the causes of the malfunction and the criticality criteria, and
manage restoration of operation of a part of the installation that is out of service according to the causes of malfunctioning, a state of electric lines of the installation and the criticality level, according to a predefined decision tree,
wherein in managing restoration of operation, the circuitry prevents automated restoration of operation of the part of the installation that is out of service when the criticality level of the malfunction indicates an Earth leakage or short circuit.

10. The maintenance device according to claim 9 wherein said circuitry is further configured to:

store data representative of an electric installation to be monitored, and
communicate with other devices.

11. The maintenance device according to claim 9 wherein the circuitry is further configured to detect a short-circuit in at least one line of the electric installation to be monitored.

12. The maintenance device according to claim 9 wherein the circuitry is further configured to detect a leakage current in at least one line of the electric installation to be monitored to generate signals representative of a current earth leakage, or
detect an insulation fault in the at least one line of the electric installation to be monitored to generate signals representative of an insulation fault.

13. The maintenance device according to claim 9 wherein the circuitry is further configured to receive remote control of at least part of the electric equipment.

14. An electric installation comprising:

electric equipment; and
circuitry configured to
enter data representative of an electric installation to be monitored in a database,
store data representative of electric equipment settings and parameters,
store data representative of events occurring in said electric installation to be monitored in a database so as to constitute an events history,
store criticality criteria used to determine a criticality level of malfunctions;
detect malfunctioning of at least one electric protection equipment in the electric installation or of the electric installation itself,
analyze causes of the malfunctioning according to data of the events history and a state of the installation,
determine a criticality level of the malfunctioning based on the causes of the malfunction and the criticality criteria, and
manage restoration of operation of a part of the installation that is out of service according to the causes of malfunctioning, a state of electric lines of the installation and the criticality level, according to a predefined decision tree,
wherein in managing restoration of operation, the circuitry prevents automated restoration of operation of the part of the installation that is out of service when the criticality level of the malfunction indicates an Earth leakage or short circuit.

* * * * *